United States Patent
Chiu et al.

(10) Patent No.: US 8,963,465 B2
(45) Date of Patent: Feb. 24, 2015

(54) MULTI-PRESSURE-QUANTITY FAN CONTROL SYSTEM AND COMPUTER SYSTEM HAVING THE SAME

(71) Applicant: International Business Machines Corporation, Armonk, NY (US)

(72) Inventors: Charlie C C Chiu, Taichung (TW); Edward Y C Kung, Xindian (TW); Tzongli Lin, Taipei (TW); Bruce A. Smith, Apex, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 215 days.

(21) Appl. No.: 13/649,272

(22) Filed: Oct. 11, 2012

(65) Prior Publication Data

US 2013/0099712 A1 Apr. 25, 2013

(30) Foreign Application Priority Data

Oct. 25, 2011 (TW) .............................. 100138591 A

(51) Int. Cl.
*F24F 11/04* (2006.01)
*F04D 27/00* (2006.01)

(52) U.S. Cl.
CPC .................. *F04D 27/004* (2013.01)
USPC .............. 318/452; 318/34; 318/456; 700/12; 700/275; 700/276; 454/239; 454/238; 165/246

(58) Field of Classification Search
CPC .............. F04D 27/004; H02K 11/0073; H02P 23/0077; G04C 23/12
USPC .............. 318/452, 34; 700/452, 11, 275, 276; 165/246; 417/31, 44.3; 454/239, 238
See application file for complete search history.

(56) References Cited

U.S. PATENT DOCUMENTS

| | | | |
|---|---|---|---|
| 6,037,732 A | 3/2000 | Alfano et al. | |
| 6,104,003 A | 8/2000 | Jones | |
| 6,318,965 B1 | 11/2001 | Nair | |
| 6,532,423 B2 * | 3/2003 | Chen et al. | 702/45 |
| 6,869,269 B2 | 3/2005 | Huang et al. | |
| 6,954,684 B2 | 10/2005 | Frankel et al. | |
| 7,095,188 B1 * | 8/2006 | Lin | 318/400.12 |

(Continued)

FOREIGN PATENT DOCUMENTS

| | | |
|---|---|---|
| CN | 1427318 A | 7/2003 |
| CN | 2775530 Y | 4/2006 |

OTHER PUBLICATIONS

HP, "HP Blade System c-Class Architecture" Technology Brief, 3rd edition, TC100902TB, Sep. 2010, 23 pages.

(Continued)

*Primary Examiner* — Rita Leykin
(74) *Attorney, Agent, or Firm* — Katherine S. Brown; Jeffrey L. Streets

(57) ABSTRACT

A multi-pressure-quantity fan control system for a computer system is provided. The multi-pressure-quantity fan control system includes a controller. The controller provides a pressure-quantity control signal to a fan of the computer system, in order to set the fan to operate in one of a first pressure-quantity setting and a second pressure-quantity setting, wherein under a predetermined rotating speed, the fan has a first pressure-quantity curve for the first pressure-quantity setting and a second pressure-quantity curve for the second pressure-quantity setting.

12 Claims, 3 Drawing Sheets

(56) References Cited

U.S. PATENT DOCUMENTS

| | | | |
|---|---|---|---|
| 7,343,505 B2 | 3/2008 | Chotoku et al. | |
| 7,347,774 B2 | 3/2008 | Aronstam et al. | |
| 7,761,192 B2 * | 7/2010 | Lo | 700/304 |
| 8,223,025 B2 * | 7/2012 | Stiver et al. | 340/584 |
| 8,285,420 B2 * | 10/2012 | Sugiyama et al. | 700/278 |
| 8,489,250 B2 * | 7/2013 | Aklilu et al. | 700/300 |
| 2006/0168975 A1 * | 8/2006 | Malone et al. | 62/180 |
| 2009/0256512 A1 | 10/2009 | Begun et al. | |
| 2010/0296946 A1 * | 11/2010 | Chen et al. | 417/44.2 |
| 2011/0077796 A1 | 3/2011 | Aklilu et al. | |

OTHER PUBLICATIONS

Obinelo, Izuh "Thermal Management by Degree—Thermal Design in Electronics Packaging", Degree Controls Inc. 2004, Engineered Airflow. Intelligent Cooling.

Gerlad Tan, "Fundalmetals of Brushless DC Axial Cooling Fans", Sanyo Denki America, Inc., Mar. 31, 2008, pp. 1-7 and a cover page.

* cited by examiner

US 8,963,465 B2

MULTI-PRESSURE-QUANTITY FAN CONTROL SYSTEM AND COMPUTER SYSTEM HAVING THE SAME

CROSS-REFERENCE TO RELATED APPLICATIONS

This application is based on and claims the benefit of priority from Taiwan Patent Application 100138591, filed on Oct. 25, 2011.

BACKGROUND

1. Field of the Invention

The present invention relates to a fan control system and a method for a computer system.

2. Background of the Related Art

Generally, a computer system, for example a personal computer or high-end server, will have a cooling fan installed inside the system for heat dissipation. Particularly, for the existing central processing unit (CPU) or storage device, such as memory or hard disk, due to the increased processing speed and correspondingly the resulted high temperature, it is further required for employing a cooling fan to enhance the effect of heat dissipation to prevent the system damage due to being overheated.

The system may include a thermal diode, DTS (Digital thermal Sensor), or PECI (Platform Environment Control Interface) provided by Intel Corp., to monitor the temperature of a device in the computer system, such as the CPU, and further control the cooling fan. When the temperature of the device is getting higher, the fan provides more airflow. For example, Q-Fan Technology® is provided by ASUSTeK Computer Inc., and Precision Cooling Technology® and QST (Quiet System Technology®) are provided by Intel Corp. PECI employs the on-die DTS to provide digital information regarding the temperature of a processor, and QST uses the PECI reading output from the CPU as feedback to control the fan so that the temperature from a sensor approaches a temperature control value.

BRIEF SUMMARY

One embodiment of the invention provides a fan control system for a computer system having a fan, the fan having a first pressure-quantity setting and a second pressure-quantity setting, and under a predetermined rotating speed, the fan having a first pressure-quantity curve for the first pressure-quantity setting and a second pressure-quantity curve for the second pressure-quantity setting. The fan control system comprises a controller for providing a pressure-quantity control signal to the fan so as to set the fan to operate in one of the first pressure-quantity setting and the second pressure-quantity setting.

Another embodiment of the invention provides a computer system comprising one or more target devices, a fan, and a fan control system. The fan provides airflow to the one or more target devices, wherein the fan has a first pressure-quantity setting and a second pressure-quantity setting, and wherein under a predetermined rotating speed, the fan has a first pressure-quantity curve for the first pressure-quantity setting and a second pressure-quantity curve for the second pressure-quantity setting. The fan control system includes a controller for providing a pressure-quantity control signal to the fan so as to set the fan to operate in one of the first pressure-quantity setting and the second pressure-quantity setting.

Yet another embodiment of the invention provides a computer system, comprising one or more target devices, a fan for providing airflow to the one or more target devices, and a controller for providing a logic signal and a pulse width modulation signal to the fan via the same communication port so as to control an operation of the fan.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings. In the drawings.

DETAILED DESCRIPTION

Figure 1:
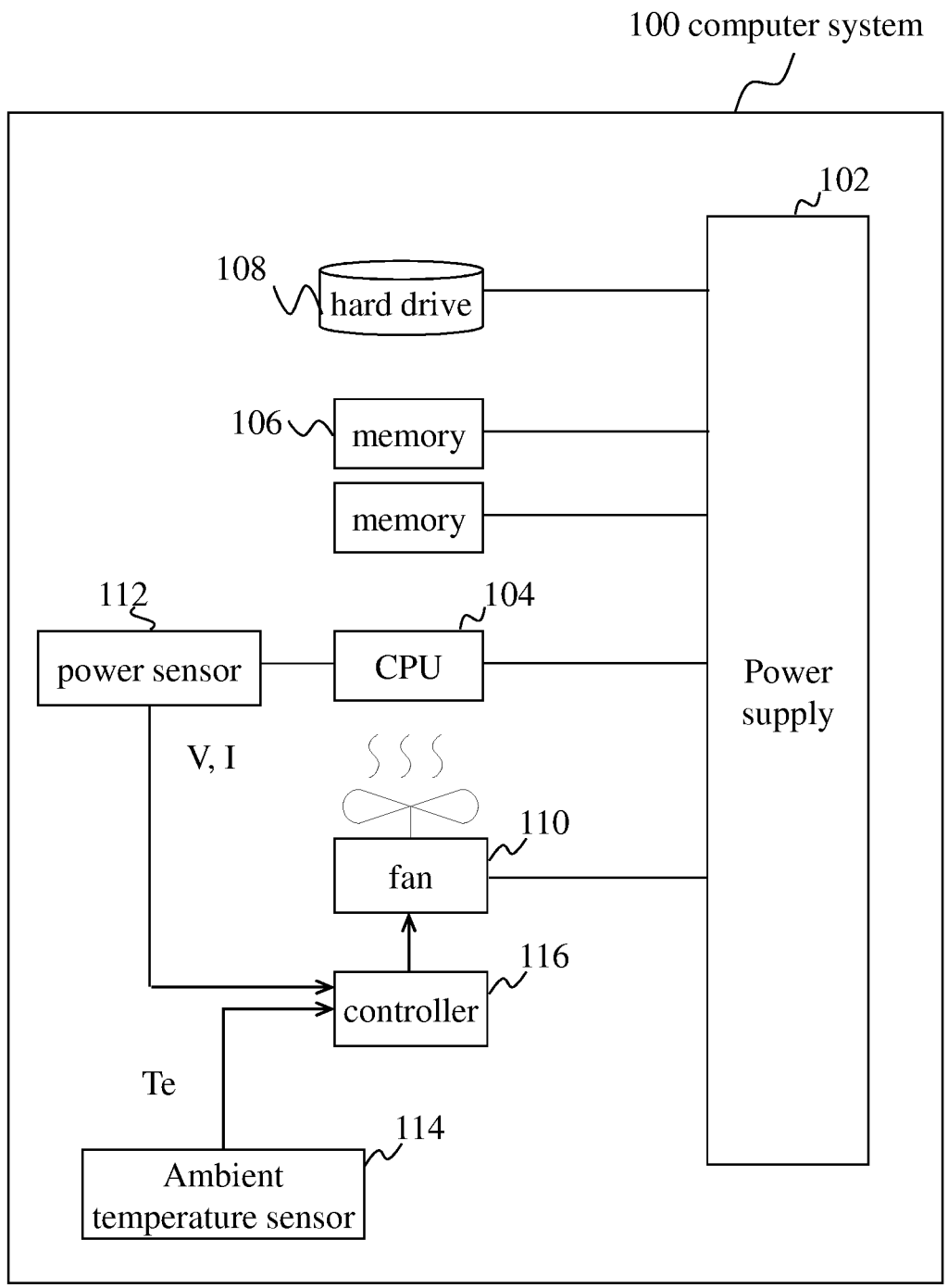
FIG. 1 is a diagram of a computer system in accordance with one embodiment of the present invention.

The present invention provides a novel fan control system and a computer system having the fan control system, wherein the computer system has a fan with multiple pressure-quantity (PQ) settings, and the fan can operate selectively in one of the PQ settings according to the need of the computer system. More specifically, under a given rotating speed, the fan has different PQ curves for different PQ settings. Some embodiments of the present invention provide the advantage of providing greater flexibility in heat dissipation design of computer systems and optimize the cost, power, efficiency, and fan performance according to the practical configuration of the computer system.

In one embodiment, the fan control system uses a logic signal as a PQ control signal to set the PQ setting of the fan. The fan control system may also use a pulse width modulation (PWM) signal as a rotating speed control signal to control the rotating speed of the fan. In particular, the fan control system sends the PQ control signal and the rotating speed control signal via a single communication port. Preferably, the fan also receives the PQ control signal and the rotating speed control signal via a single communication port. One advantage of such configurations is to conserve the amount of communication ports and further to reduce the volume of the controller.

In another embodiment of the present invention, a fan control system for a computer system includes a controller. For example, the controller may provide a PQ control signal to the fan of the computer system so as to set the fan to operate in one of the first PQ setting and the second PQ setting, wherein under a predetermined rotating speed, the fan has a first PQ curve for the first PQ setting and a second PQ curve for the second PQ setting. The computer system may further include one or more target devices.

In yet another embodiment, the computer system includes one or more target devices, a fan, and a controller. The fan provides airflows to the one or more target devices. The controller provides the logic signal and the PWM signal to the fan to control the operation of the fan.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

FIG. 1 shows hardware architecture of a computer system 100 in accordance with one embodiment, which comprises a power supply 102, a CPU 104, a memory 106, a hard disk 108, a fan 110, a power sensor 112, an ambient temperature sensor 114, and a controller 116. Other basic architectures and components for the computer system 100 may also be included, where the computer system may, for example, be an ordinary personal computer or server, such as System X®, Blade Center® or eServer® server (available from International Business Machines Corporation). The details a computer system that are not related to the present invention have been omitted.

When the computer system 100 is operating, the power supply 102 is mainly providing DC power to the CPU 104, the memory 106, the hard disk 108, and the fan 110. It should be noted that the memory 106, the hard disk 108, and the fan 110 could be called target devices in the specification, because they will generate a large amount of heat during operation. The purpose of the fan 110 is to cool down these target devices. In an embodiment shown in FIG. 1, only the CPU 104 has a fan 110. But, in other embodiments (not shown), the CPU 104, the memory 106, and the hard disk 108 may each have an individual corresponding fan to enhance the efficiency of heat dissipation. In order to clearly describe the present invention, only the CPU 104 and a single fan 110 are used in the description. However, embodiments of the present invention include any one or more target device that generates heat and needs to be cooled in the computer system. The description here may refer to the CPU 104, but the description is also applicable to embodiments where the one or more target device includes the memory 106, the hard disk 108, or any other target device.

Preferably, the fan 110 is a so-called "smart fan", which has a microprocessor (MCU) (not shown) to drive or manage the operation of the fan 110. For example, the microprocessor of the fan 110 can receive Pulse Width Modulation (PWM) signals and control the speed of the fan 110 according to the duty cycle in the PWM signals. In an optional embodiment, the microprocessor of the fan 110 may be modified based on the microprocessor AVR442 from Atmel Corporation, LB1860 from SANYO Semiconductor Co. Ltd, or ZXBM200 from Zetex Semiconductors.

In particular, the fan 110 has at least two pressure-quantity (PQ) settings. In the embodiments described herein, the fan 110 has a first PQ setting and a second PQ setting (i.e. two different PQ settings). However, those skilled in the art should recognize that the fan 110 can have two or more PQ settings.

Figure 2:
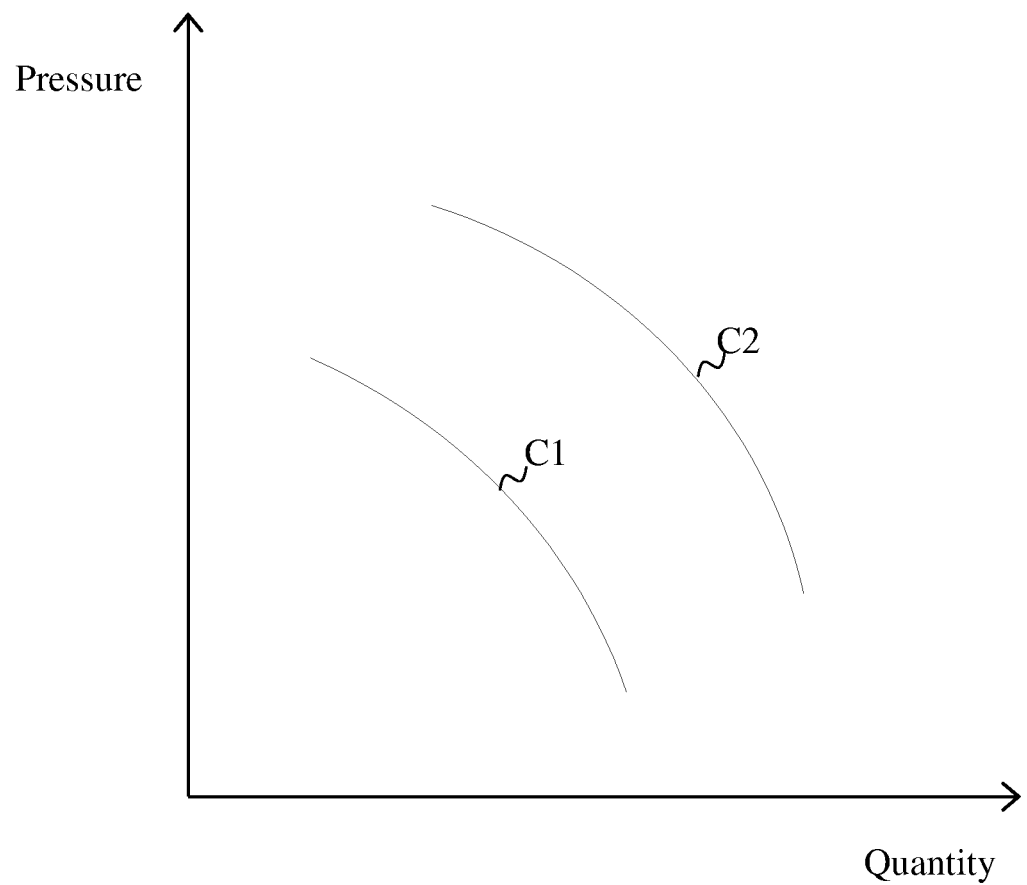
FIG. 2 is a diagram showing pressure-quantity (PQ) curves for different PQ settings in accordance with another embodiment of the present invention.

More specifically, as shown in FIG. 2, under a given rotating speed of the fan 110, the fan 110 will have a first PQ curve (C1) for the first PQ setting and a second PQ curve (C2) for the second PQ setting. That is, as shown in FIG. 2, under the predetermined rotating speed, the fan 110 operating in the second PQ setting can generate higher pressure and more quantity than in the first PQ setting.

In this embodiment, in order to achieve two or more PQ settings, the fan 110 has an adjustable structure, such as air intake-adjustable inlet, or angle, diameter, or pitch-adjustable blade, or adjustable damper, but the present invention is not limited thereto.

The microprocessor of the fan 110 can correspondingly adjust the adjustable structure of the fan 110 in response to the received PQ control signal so as to set the fan 110 to operate in the first PQ setting (or the second PQ setting). For example, as the computer system 100 has fewer target devices, the microprocessor of the fan 110, in response to the received PQ control signal, can set the fan 110 to operate in the first PQ setting (i.e. the first PQ curve (C1) in FIG. 2). In comparison with the second PQ curve (C2), under the given rotating speed, the fan 110 operating in the first PQ setting can provide less pressure and quantity, resulting in power conservation.

The power sensor 112 can measure the voltage difference V on both ends of CPU 104, and can also provide a tiny resistance, such as 0.001 Ohm, for measuring the current I of CPU 104. Accordingly, the controller 116 may employ the measured voltage drop V and the current I to obtain the amount of power consumed by the CPU 104. In alternative embodiments where the target device is the memory 106, the hard disk 108, or any other target device in the computer system, the controller is similarly able to measure the power actually consumed by these devices.

The ambient temperature sensor 114 is configured to detect the temperature Te in the operating environment, i.e. room temperature, and is preferably installed outside the computer system 100. The ambient temperature sensor 114 may employ a conventional digital thermal sensor, and directly generate a digital signal corresponding to the detected ambient temperature. It should be noted that the ambient temperature sensor 114 and the CPU 104 should have an appropriate distance therebetween to prevent the heat generated by CPU 104 from influencing the ambient temperature sensor 114.

The controller 116 comprises a microprocessor and memory (not shown). For example, the controller may be a Baseboard Management Controller (BMC). A BMC may be integrated on a motherboard (not shown) of the computer system 100, such as VSC 452 BMC provided by Maxim Corp. or SE-SM4210-P01 BMC provided by ServerEngines Corp. It should be noted that the controller 116 may also be implemented as an independent controller.

The controller 116 can have one or more signal ports for outputting control signals to the fan 110 so as to control the operation of the fan 110 or to set the configuration of the fan 110. For example, the controller 116 can output PWM signals with different duty cycles to the microprocessor of the fan 110 as the rotating speed control signal to control the rotating speed of the fan 110. In addition, the controller 116 can output different PQ control signals to the microprocessor of the fan 110 to set the fan 110 to operate in the first PQ setting (or the second PQ setting). For example, the controller 116 can output different digital logic signals to the microprocessor of the fan 110 as the PQ control signals. The details of this control scheme will be described later with reference to the flowchart of FIG. 3. Preferably, the controller 116 outputs the rotating speed control signal (PWM signal) and the PQ control signal (digital logic signal) to the microprocessor of the fan 110 via the same signal port to reduce the number of required ports. More preferably, the rotating speed control signal (PWM signal) and the PQ control signal (digital logic signal) have the same high level and low level to simplify the circuit design of the controller 116. In addition, the controller 116 can have one or more signal ports to receive signals from the fan 110 or can output signals to the fan and receive signals from the fan 110 via the same signal port.

In this embodiment, the controller 116 has an A/D port (not shown) for receiving the voltage drop V and the current I detected by the power sensor 112, and thus calculates the power P consumed by CPU 104 (or memory 106, or hard disk 108). The controller 116 may also have other A/D port (not shown), which can receive the ambient temperature Te detected by the ambient temperature sensor 114.

Furthermore, the memory of the controller 116 stores the firmware required for controlling the fan and other associated parameters, such as Specific Heat Capacity/Density of air, sectional area of the CPU 104 facing the airflow of the fan, threshold operating temperature Tm (Case Temperature) of CPU 104, or other parameters of CPU 104.

Figure 3:
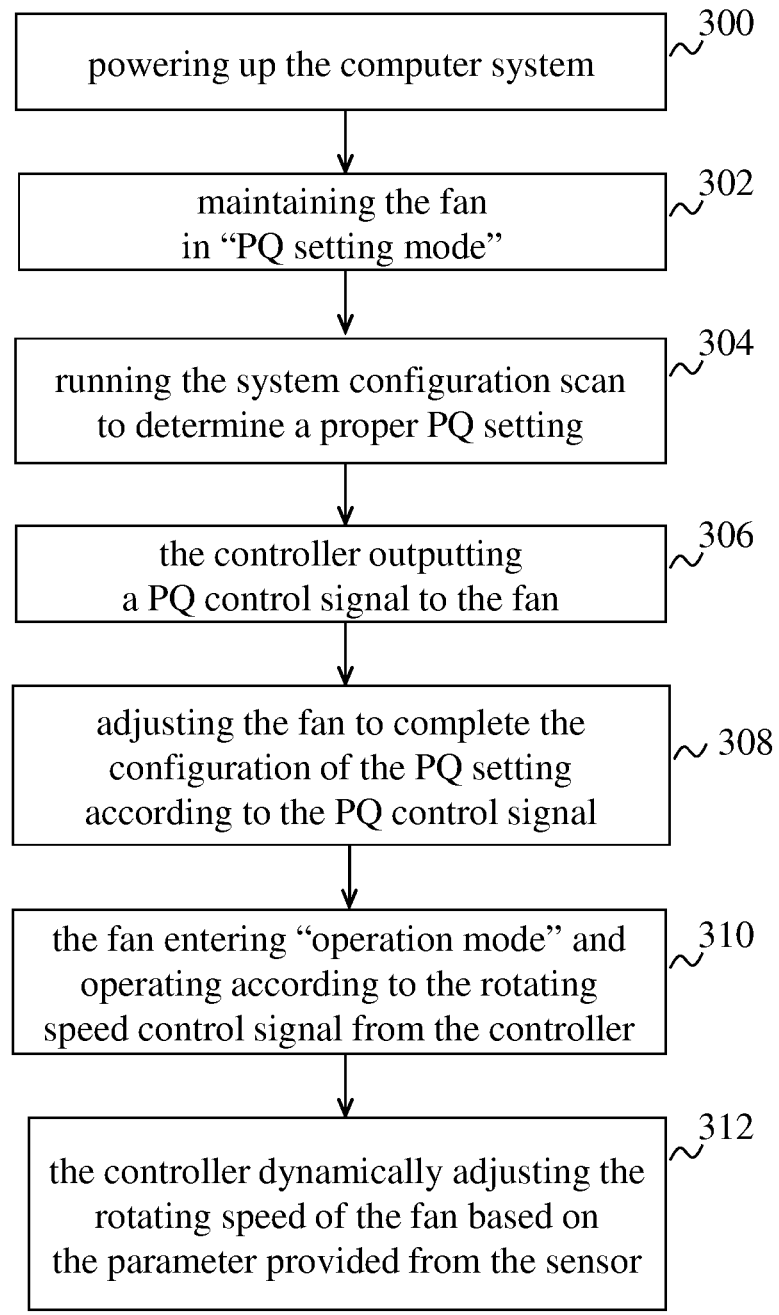
FIG. 3 is a flowchart of a method in accordance with yet another embodiment of the present invention.

Referring to the hardware architecture of FIG. 1 and the flowchart of FIG. 3, the configuration and control method of the fan is described in accordance with one embodiment of the present invention.

In Step 300, the computer system 100 is powered up.

In Step 302, the fan 110 stays in the PQ setting mode and waits to receive the PQ control signal from the controller 116.

In Step 304, the controller 116 (e.g. BMC on the motherboard of the computer system 100) runs the system configuration scan to determine a proper PQ setting for the fan 110. In this step, the controller 116 collects data on characteristics, location, and/or number of heat-generating target devices (e.g. CPU 104, memory 106, hard drive 108, etc.) installed on the computer system 100. Taking the memory 106 as an example, the controller 116 obtains the specification of the memory 106 (e.g. DDR-SRAM 256 Mb or DDR-SRAM 512 Mb, or its operation duty cycle), location of memory (e.g. installed on which slot), and amount of memory (e.g. two DDR-SRAM 256 Mb or a single DDR-SRAM 512 Mb). Optionally, the controller 116 can run the system configuration scan to obtain data on characteristics (e.g. dimension or maximum output power), location, and/or amount of cooling fans (e.g. one or more fans 110) installed on the computer system 100. After running the system configuration scan, the controller 116 can determine a proper PQ setting (i.e. the first PQ setting for power-saving or the second PQ setting for enhanced fan performance) for the fan 110 based on a predetermined setting rule or a look-up table. The predetermined setting rule or the look-up table can be constructed according to different system characteristics. As such, even if the same fan 110 is used, when that fan is disposed in different position of the computer system 100 (e.g. near the CPU 104 or near the hard drive 108), the controller 116 may determine a different PQ setting.

It is noted that information about the computer system 110 obtained from the system configuration scan is not limited to information about the target devices and/or the fan as described above. Other information associated with system heat dissipation, such as altitude of the computer system 100 (associated with air density), is within the scope of the present invention and can be provided to the controller 116 for use in determining the PQ setting of the fan 110.

In Step 306, after the controller 116 determines a proper PQ setting for the fan 110, the controller 116 outputs a corresponding PQ control signal to the microprocessor of the fan 110. Preferably, the PQ control signal is in the form of a digital logic square wave signal. In one embodiment, the controller 116 sends, in a frequency of 100 KHz, a 10-bit program command to the microprocessor of the fan 110.

For example, if the value of the first five bits is [11111], then it means that the command is to provide the PQ setting control signal to the fan. If the value of the first five bits is [11011], then it means that the command is to request that the fan 110 return the current PQ setting. The 6 to 9 bits represent the desirable PQ setting. If the value is [0000], then it means that the PQ setting is the first PQ setting as described above. If the value is [0001], then it means that the PQ setting is the second PQ setting as described above. As such, it can represent up to 16 different PQ settings. If the value of the last one bit is [1], then it means the ending of the command. It is noted that the data required for PQ setting can be sent based on the digital logic signals as described above, but the present invention is not limited thereto. Other program commands can also be sent to the fan 110 through such digital logic signals to continue other operations.

In Step 308, after receiving the PQ control signal provided from the controller 116, the structure of the fan 110 is correspondingly adjusted, by which the fan 110 is set to operate in the first PQ setting (or the second PQ setting). In one embodiment, after a predetermined period of time (e.g. 100 ms) upon receiving the PQ control signal, the fan 110 can further send a PQ setting confirmation signal (e.g. a 5-bit signal of [11111]) to the controller 116 by way of digital logic signals to confirm the completion of setting the PQ setting of the fan 110.

In Step 310, after the completion of setting of the PQ setting, the fan 110 enters operation mode and waits to receive a rotating speed control signal from the controller 116, by which the fan can operate in a corresponding rotating speed. Preferably, the rotating speed control signal is a PWM signal, wherein the duty cycle in the PWM signal is used to control the rotating speed of the fan 110. The details of a PWM signal are well-known in the art and will not be elaborated upon hereinafter. In this step, the controller 116 can control the fan 110 to operate in a predetermined initial rotating speed and then can adjust the rotating speed according to the rotating speed obtained from step 312, discussed below.

In Step 312, the power sensor 112 and the ambient temperature sensor 114 respectively detect practical operation parameters of the computer system 100 (e.g. voltage drop V, current I, or ambient temperature Te as described above) and send them to the controller 116, by which the controller 116 can further dynamically adjust the rotating speed of the fan 110.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A fan control system for a computer system having a fan, the fan having a first pressure-quantity setting and a second pressure-quantity setting, and under a predetermined rotating speed, the fan having a first pressure-quantity curve for the first pressure-quantity setting and a second pressure-quantity curve for the second pressure-quantity setting, the fan control system comprising:
a controller for providing a logical pressure-quantity control signal to the fan so as to set the fan to operate in one of the first pressure-quantity setting and the second pressure-quantity setting, wherein after the pressure-quantity control signal is provided, the controller further provides a rotating speed control signal to the fan so as to control a rotating speed of the fan, wherein the rotating speed control signal is a pulse width modulation signal, and wherein the controller provides the pressure-quantity control signal and the rotating speed control signal to the fan via the same communication port.

2. The fan control system of claim 1, wherein the controller provides the pressure-quantity control signal according to a characteristic, location, or number of the fans.

3. The fan control system of claim 1, further comprising:
a sensor for detecting a parameter associated with an operation of the computer system, wherein the controller adjusts the rotating speed control signal according to the parameter detected by the sensor.

4. The fan control system of claim 1, wherein the fan has an adjustable structure, and wherein the pressure-quantity control signal causes the fan to adjust the adjustable structure.

5. The fan control system of claim 4, wherein the adjustable structure is selected from an adjustable air intake, adjustable pitch blades, and an adjustable damper.

6. A computer system, comprising:
one or more target devices;
a fan for providing airflow to the one or more target devices; and
a controller for providing a logic signal for switching the fan between a first pressure-quantity setting and a second pressure-quantity setting and a pulse width modulation signal to the fan for controlling a rotating speed of the fan via the same communication port so as to control an operation of the fan.

7. The computer system of claim 6, wherein the controller provides the pressure-quantity control signal according to a characteristic, location, or number of the one or more target devices.

8. The computer system of claim 6, wherein the controller provides the pressure-quantity control signal according to a characteristic, location, or number of the fans.

9. The computer system of claim 6, further comprising:
a sensor for detecting a parameter associated with operation of the computer system, wherein the controller adjusts the rotating speed control signal according to the parameter detected by the sensor.

10. The computer system of claim 6, wherein the fan has a first pressure-quantity setting and a second pressure-quantity setting, wherein under a predetermined rotating speed, the fan has a first pressure-quantity curve for the first pressure-quantity setting and a second pressure-quantity curve for the second pressure-quantity setting, and wherein the logic signal is configured to set the fan to operate in one of the first pressure-quantity setting and the second pressure-quantity setting.

11. The computer system of claim 6, wherein the fan has an adjustable structure, and wherein the pressure-quantity control signal causes the fan to adjust the adjustable structure.

12. The computer system of claim 11, wherein the adjustable structure is selected from an adjustable air intake, adjustable pitch blades, and an adjustable damper.

* * * * *